United States Patent
Chandraker et al.

(10) Patent No.: US 10,289,822 B2
(45) Date of Patent: *May 14, 2019

(54) LIVENESS DETECTION FOR ANTISPOOF FACE RECOGNITION

(71) Applicants: NEC Laboratories America, Inc., Princeton, NJ (US); NEC Hong Kong Limited, Hunghom, Kowloon (HK)

(72) Inventors: Manmohan Chandraker, Santa Clara, CA (US); Xiang Yu, Mountain View, CA (US); Eric Lau, Kowloon (HK); Elsa Wong, Kowloon (HK)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/637,264

(22) Filed: Jun. 29, 2017

(65) Prior Publication Data
US 2018/0025217 A1    Jan. 25, 2018

Related U.S. Application Data

(60) Provisional application No. 62/366,285, filed on Jul. 25, 2016, provisional application No. 62/365,510, filed on Jul. 22, 2016.

(51) Int. Cl.
*G06K 9/00* (2006.01)
*G06F 21/32* (2013.01)
(Continued)

(52) U.S. Cl.
CPC .......... *G06F 21/32* (2013.01); *G06F 21/6218* (2013.01); *G06K 9/00221* (2013.01);
(Continued)

(58) Field of Classification Search
CPC ............... G06F 21/32; G06F 21/6218; G06F 17/30259; G06F 17/30256; G06N 99/005;
(Continued)

(56) References Cited

U.S. PATENT DOCUMENTS

| 8,437,513 | B1* | 5/2013 | Derakhshani | ...... G06K 9/00597 382/115 |
| 8,856,541 | B1* | 10/2014 | Chaudhury | ............. G06F 21/32 382/115 |
| 9,275,269 | B1 | 3/2016 | Li et al. | |
| 9,965,610 | B2* | 5/2018 | Chandraker | ....... G06K 9/00228 |
| 2014/0016837 | A1* | 1/2014 | Nechyba | ............ G06K 9/00228 382/118 |
| 2014/0177955 | A1 | 6/2014 | Srinivasan et al. | |

(Continued)

OTHER PUBLICATIONS

Zhang, Zhiwei, Dong Yi, Zhen Lei, and Stan Z. Li. "Face liveness detection by learning multispectral reflectance distributions." In Automatic Face & Gesture Recognition and Workshops (FG 2011), 2011 IEEE International Conference on, pp. 436-441. IEEE, 2011. (Year: 2011).*

(Continued)

*Primary Examiner* — Carol Wang
(74) *Attorney, Agent, or Firm* — Joseph Kolodka

(57) ABSTRACT

A face recognition system and corresponding method are provided. The face recognition system includes a camera configured to capture an input image of a subject purported to be a person. The face recognition system further includes a memory storing a deep learning model configured to perform multi-task learning for a pair of tasks including a liveness detection task and a face recognition task. The face recognition system also includes a processor configured to apply the deep learning model to the input image to recognize an identity of the subject in the input image and a liveness of the subject. The liveness detection task is configured to evaluate a plurality of different distractor modalities corresponding to different physical spoofing materials to prevent face spoofing for the face recognition task.

20 Claims, 14 Drawing Sheets

(51) Int. Cl.
*G06N 20/00* (2019.01)
*G06N 99/00* (2019.01)
*G07C 9/00* (2006.01)
*H04L 29/06* (2006.01)
*G06F 21/62* (2013.01)
*G06K 9/46* (2006.01)
*G06K 9/66* (2006.01)

(52) U.S. Cl.
CPC ..... *G06K 9/00228* (2013.01); *G06K 9/00255* (2013.01); *G06K 9/00281* (2013.01); *G06K 9/00288* (2013.01); *G06K 9/00624* (2013.01); *G06K 9/00791* (2013.01); *G06K 9/00906* (2013.01); *G06K 9/4652* (2013.01); *G06K 9/66* (2013.01); *G06N 20/00* (2019.01); *G06N 99/005* (2013.01); *G07C 9/00158* (2013.01); *G07C 9/00166* (2013.01); *H04L 63/0861* (2013.01); *H04L 63/1483* (2013.01); *G06F 2221/2133* (2013.01)

(58) Field of Classification Search
CPC ............ H04L 63/0861; H04L 63/1483; G07C 9/00166; G07C 9/00158; G06K 9/00228; G06K 9/00906; G06K 9/00255; G06K 9/00791; G06K 9/4652; G06K 9/00624; G06K 9/00281; G06K 9/00221; G06K 9/00288; G06K 9/66; G06K 9/00067; G08B 21/0222; G08B 21/0208; G08B 21/0461; G08B 21/24; G08B 21/0205
See application file for complete search history.

(56) References Cited

U.S. PATENT DOCUMENTS

| | | | |
|---|---|---|---|
| 2014/0337948 A1* | 11/2014 | Hoyos | H04L 63/0861 726/7 |
| 2015/0262024 A1* | 9/2015 | Braithwaite | G06K 9/00255 382/118 |
| 2016/0140405 A1 | 5/2016 | Graumann et al. | |
| 2016/0366129 A1* | 12/2016 | Chen | H04L 63/0861 |
| 2016/0371555 A1* | 12/2016 | Derakhshani | G01S 7/539 |
| 2018/0025217 A1* | 1/2018 | Chandraker | G06K 9/00228 382/118 |
| 2018/0025242 A1* | 1/2018 | Chandraker | G06K 9/00228 382/118 |
| 2018/0025243 A1* | 1/2018 | Chandraker | G06K 9/00228 382/118 |
| 2018/0096196 A1* | 4/2018 | Gordon | G06T 7/20 |

OTHER PUBLICATIONS

Jee, et al., "Liveness Detection for Embedded Face Recognition System", International Journal of Biological and Medical Sciences, Dec. 2006, pp. 235-238, vol. 1(4).

Kim, et al., "Face Liveness Detection Based on Texture and Frequency Analysis", 5th IAPR International Conference on Biometrics (ICB), Mar. 2012, pp. 67-72.

Szegedy, et al., "Going Deeper with Convolutions", IEEE International Conference on Computer Vision and Pattern Recognition, Jun. 2015. pp. 1-9.

\* cited by examiner

LIVENESS DETECTION FOR ANTISPOOF FACE RECOGNITION

RELATED APPLICATION INFORMATION

This application claims priority to U.S. Provisional Patent Application Ser. No. 62/365,510, filed on Jul. 22, 2016, incorporated herein by reference herein its entirety. This application claims priority to U.S. Provisional Patent Application Ser. No. 62/366,285, filed on Jul. 25, 2016, incorporated herein by reference herein its entirety. This application is related to an application entitled "Camera System for Traffic Enforcement", and which is incorporated by reference herein in its entirety. This application is related to an application entitled "Security System for Facility Access Control", and which is incorporated by reference herein in its entirety. This application is related to an application entitled "Physical System Access Control", and which is incorporated by reference herein in its entirety. This application is related to an application entitled "Login Access Control for Secure/Private Data", and which is incorporated by reference herein in its entirety.

BACKGROUND

Technical Field

The present invention relates to security and more particularly to liveness detection for antispoof face recognition.

Description of the Related Art

Face recognition has been used to recognize individuals. However, current face recognition systems and approaches are often spoofed using inanimate objects. Thus, there is a need for an improvement to current face recognition systems and approaches that is capable of thwarting spoofing attempts.

SUMMARY

According to an aspect of the present invention, a face recognition system is provided. The face recognition system includes a camera configured to capture an input image of a subject purported to be a person. The face recognition system further includes a memory storing a deep learning model configured to perform multi-task learning for a pair of tasks including a liveness detection task and a face recognition task. The face recognition system also includes a processor configured to apply the deep learning model to the input image to recognize an identity of the subject in the input image and a liveness of the subject. The liveness detection task is configured to evaluate a plurality of different distractor modalities corresponding to different physical spoofing materials to prevent face spoofing for the face recognition task.

According to another aspect of the present invention, a computer-implemented method is provided for liveness detection and face recognition. The method includes capturing, by a camera, an input image of a subject purported to be a person. The method further includes storing, in a memory, a deep learning model configured to perform multi-task learning for a pair of tasks including a liveness detection task and a face recognition task. The method also includes applying, by a processor, the deep learning model to the input image to recognize an identity of the subject in the input image and a liveness of the subject. The liveness detection task is configured to evaluate a plurality of different distractor modalities corresponding to different physical spoofing materials to prevent face spoofing for the face recognition task.

According to yet another aspect of the present invention, a computer program product is provided for liveness detection and face recognition. The computer program product includes a non-transitory computer readable storage medium having program instructions embodied therewith. The program instructions are executable by a computer to cause the computer to perform a method. The method includes capturing, by a camera, an input image of a subject purported to be a person. The method further includes storing, in a memory, a deep learning model configured to perform multi-task learning for a pair of tasks including a liveness detection task and a face recognition task. The method also includes applying, by a processor, the deep learning model to the input image to recognize an identity of the subject in the input image and a liveness of the subject. The liveness detection task is configured to evaluate a plurality of different distractor modalities corresponding to different physical spoofing materials to prevent face spoofing for the face recognition task.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to liveness detection for antispoof face recognition.

The present invention advantageously distinguishes an image of a real face from that of a fake image using liveness detection. The fake image can be implemented, for example, by a high-quality three-dimensional (3D) mask, a paper print-out, an electronic display, or other "distractor" modality. The liveness detection supports face recognition to determine the authenticity of the input and can operate with various hardware. The present invention is hardware independent.

In an embodiment, a single image with purely appearance-based information can be used to distinguish an image of a real face from the image of a paper print-out of a face image. In an embodiment, one or more deep learning methods can be used that capture both local information (such as, for example, but not limited to, texture) as well as global information (such as, for example, but not limited to, shape and illumination) to provide a multi-task deep learning framework for liveness detection (e.g., using a single image).

In an embodiment, a deep network structure is set up to specialize from a generic image classification problem to the binary (alive or not alive) classification problem of liveness detection.

In an embodiment, a multi-task framework is constructed for the liveness detection task along with a large-scale face recognition task. This allows the network to learn better lower level features and improves its generalization ability.

In an embodiment, data augmentation methods are provided for training the deep learning architecture. The data augmentation methods improve detection performance in multiple scenarios.

In an embodiment, liveness detection in accordance with the present invention can be implemented on several platforms where face recognition is deployed such as, for example, but not limited to, vehicle electronic channels, automated authentication kiosks (Automated Teller Machines (ATMs), etc.), passenger electronic channels, mobile devices (such as, for example, but not limited to, cellphones and laptops), and so forth.

Figure 1:
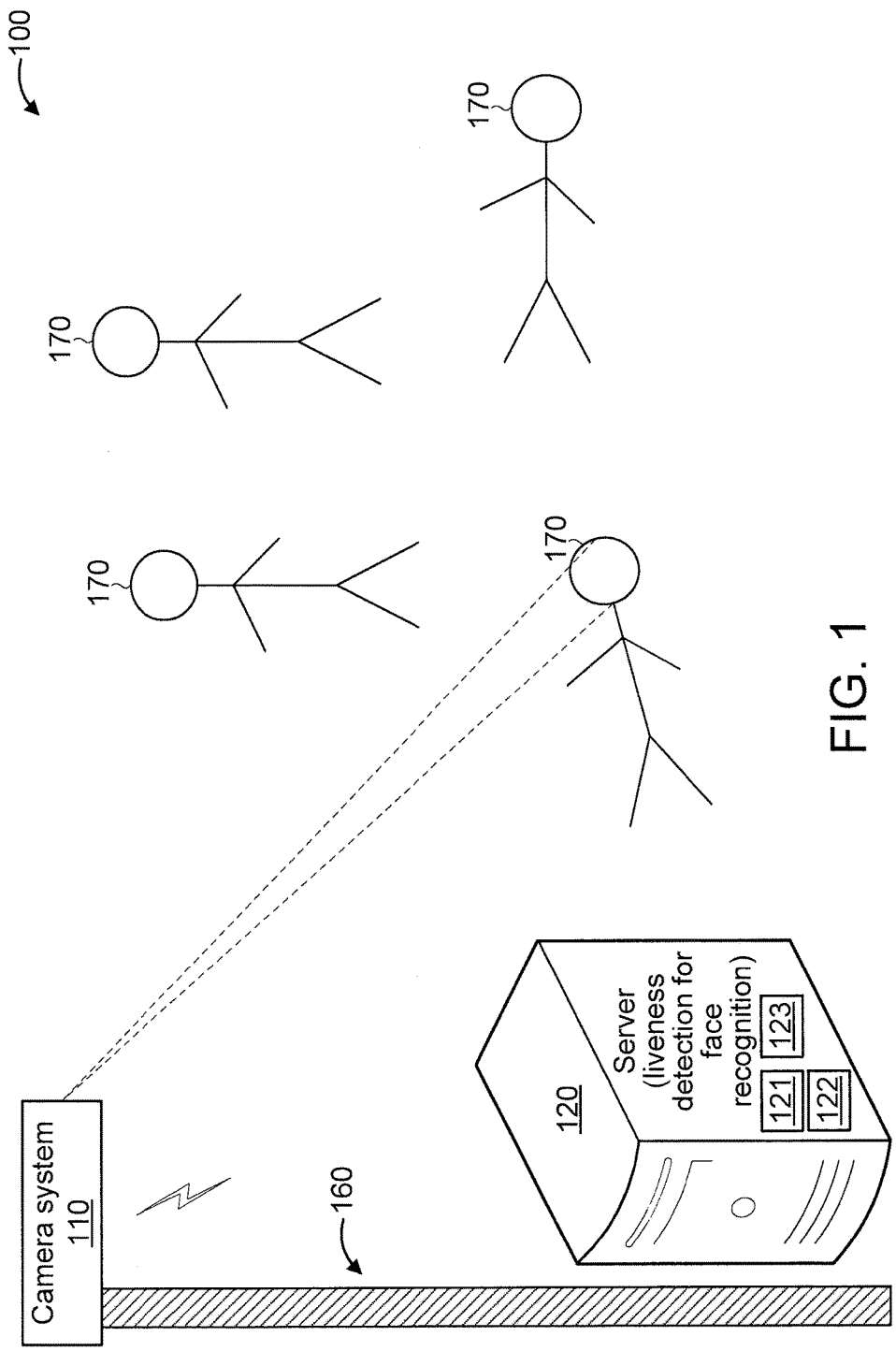
FIG. 1 shows an exemplary system for liveness detection for antispoof face recognition, in accordance with an embodiment of the present invention.

FIG. 1 shows an exemplary system 100 for liveness detection for antispoof face recognition, in accordance with an embodiment of the present invention.

The system 100 includes a camera system 110. While a single camera system 110 is shown in FIG. 1 for the sakes of illustration and brevity, it is to be appreciated that multiple camera systems can be also used, while maintaining the spirit of the present invention.

In the embodiment of FIG. 1, the camera system 110 is mounted on a mounting entity 160. For the sake of illustration, the mounting entity 160 is a pole 160. While a pole 160 is shown for the sake of illustration, any other mounting entity can be used, as readily appreciated by one of ordinary skill in the art given the teachings of the present invention provided herein, while maintaining the spirit of the present invention. For example, the camera system 110 can be mounted on a building, a drone, and so forth. The preceding examples are merely illustrative. It is to be appreciated that multiple mounting entities can be located at control hubs and sent to a particular location as needed.

The camera system 110 can be a wireless camera system or can use one or more antennas included on the pole 160 (or other mounting entity (e.g., building, drone, etc.) to which the camera system 110 is mounted or proximate).

The system 100 further includes a server 120 for liveness detection for antispoof face recognition. The server 120 can located remote from, or proximate to, the camera system 110. The server 120 includes a processor 121, a memory 122, and a wireless transceiver 123. The processor 121 and the memory 122 of the remove server 120 are configured to perform liveness detection for antispoof face recognition based on images received from the camera system 110 by the (the wireless transceiver 123 of) the remote server 120. To that end, the processor 121 and memory 122 can be configured to include components of a face recognition system and a live image recognition system. In this way, the face of a person 170 in a vehicle 180 can be recognized and a liveness of the person 170 can also be determined.

Accordingly, some exemplary suitable environments to which the present invention can be applied can include any environments where liveness detection can be used to augment a face recognition result. For example, a mass transit hub or stop, a battlefield, and/or any place where potential causalities can occur and where liveness detection can be used to advantageously augment a face recognition result (e.g., in order to determine a number of injured, a number of non-injured, a ratio of injured versus non-injured, etc.).

Figure 2:
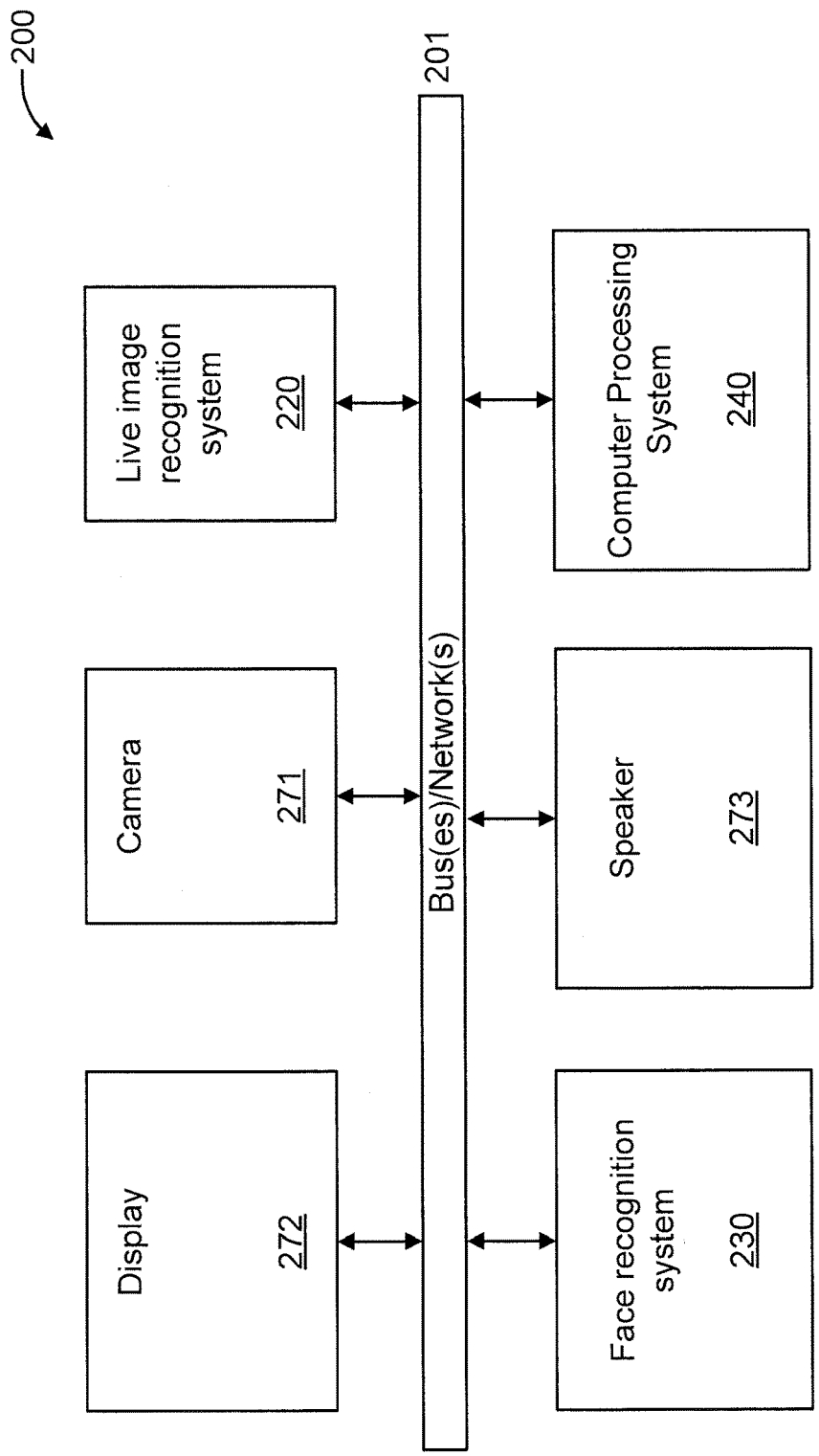
FIG. 2 shows another exemplary system for liveness detection for antispoof face recognition, in accordance with an embodiment of the present principles.

FIG. 2 shows another exemplary system 200 for liveness detection for antispoof face recognition, in accordance with an embodiment of the present principles. System 200 can represent an implementation of system 100, in accordance with an embodiment of the present invention.

The system 200 includes a live image recognition system 220, a face recognition system 230, and a computer processing system 240.

The computer processing system 240 essentially controls the other systems of system 200, including the image recognition system 220 and the face recognition system 230.

The live image recognition system 220 recognizes live images. The image recognition system 220 can, for example, detect an image of a live object versus an image of an inanimate object that is used for spoofing.

The face recognition system 230 recognizes faces. According, the face recognition system 230 can also recognize individuals associated with recognized faces.

The computer processing system 240 performs functions relating, for example, but not limited to: (i) processing image recognition results; (ii) processing face recognition result (iii) performing one or more actions based on the image recognition results and/or the face recognition results.

The live image recognition system 220 and/or the face recognition system 230 and/or the computer processing system 240 can include a camera. For the sake of illustration, a separate camera 271 is shown. The camera 271 can capture images/video of the user. The images/video can then be processed by the computer processing system 240 and/or any of the systems under its control. In an embodiment, the camera 271 can be capable of capturing still and moving images. In an embodiment, the camera can acquire images in the visible and/or infra-red spectrum.

The live image recognition system 220 and/or the face recognition system 230 and/or the computer processing system 240 can include a display. For the sake of illustration, a separate display 272 is shown. The display 272 can show liveness detection (live image) information and/or face recognition information to the user or other personnel (e.g., security personnel). For example, the display 272 can indicate to a security guard that someone is attempting to spook a face recognition system to allow the security guard to intervene.

The live image recognition system 220 and/or the face recognition system 230 and/or the computer processing system 240 can include a speaker. For the sake of illustration, a separate speaker 273 is shown. The speaker 273 can provide auditory guidance to the user (e.g., regarding face positioning, and so forth) and/or a local alert that someone is attempting to spoof the system in order to draw attention to that person.

In an embodiment, one or more of the elements of system 200 is implemented in the cloud using a cloud-based configuration.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based.

Further, while one or more elements may be shown as separate elements, in other embodiments, these elements can be combined as one element. For example, while the camera 211 is shown as a separate entity from the face recognition system 230, in other embodiments the face recognition system 230 can include the camera, obviating the need for a separate camera. Also for example, while the live image recognition system 220 is shown as a separate entity from the face recognition system 230, in other embodiments the live image recognition system 220 can be included in the face recognition system. Additionally for example, while the live image recognition system 220, the face recognition system 230, and the computer processing system 240 are shown as separate entities, in other embodiments, the live image recognition system 220 and the face recognition system 230 can be included in the computer processing system 240. The converse is also applicable, where while one or more elements may be part of another element, in other embodiments, the one or more elements may be implemented as standalone elements.

Moreover, one or more elements of FIG. 2 can be implemented in a cloud configuration including, for example, in a distributed configuration.

Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth.

These and other variations of the elements of system 200 are readily determined by one of ordinary skill in the art, given the teachings of the present principles provided herein, while maintaining the spirit of the present principles.

Figure 3:
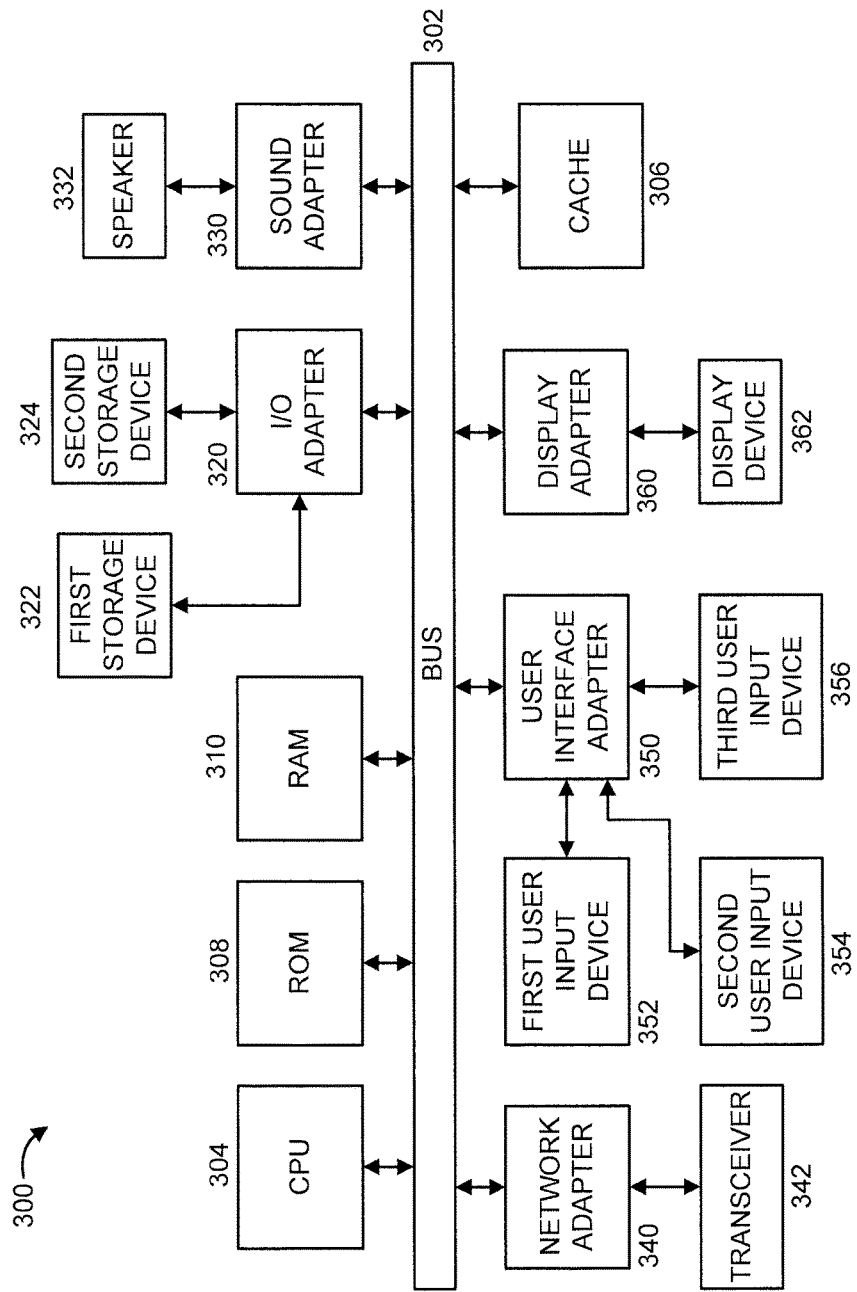
FIG. 3 shows an exemplary processing system to which the invention principles may be applied, in accordance with an embodiment of the present invention.

FIG. 3 shows an exemplary processing system 300 to which the invention principles may be applied, in accordance with an embodiment of the present invention. The processing system 300 can be used, for example, to implement the server 120 of FIG. 1, the overall system 200 or the computer processing system 240 of FIG. 2.

The processing system 300 includes at least one processor (CPU) 304 operatively coupled to other components via a system bus 302. A cache 306, a Read Only Memory (ROM) 308, a Random Access Memory (RAM) 310, an input/output (I/O) adapter 320, a sound adapter 330, a network adapter 340, a user interface adapter 350, and a display adapter 360, are operatively coupled to the system bus 302.

A first storage device 322 and a second storage device 324 are operatively coupled to system bus 302 by the I/O adapter 320. The storage devices 322 and 324 can be any of a disk storage device (e.g., a magnetic or optical disk storage device), a solid state magnetic device, and so forth. The storage devices 322 and 324 can be the same type of storage device or different types of storage devices.

A speaker 332 is operatively coupled to system bus 302 by the sound adapter 330. A transceiver 342 is operatively coupled to system bus 302 by network adapter 340. A display device 362 is operatively coupled to system bus 302 by display adapter 360.

A first user input device 352, a second user input device 354, and a third user input device 356 are operatively coupled to system bus 302 by user interface adapter 350. The user input devices 352, 354, and 356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 352, 354, and 356 can be the same type of user input device or different types of user input devices. The user input devices 352, 354, and 356 are used to input and output information to and from system 300.

Of course, the processing system 300 may also include other elements (not shown), as readily contemplated by one of skill in the art, as well as omit certain elements. For example, various other input devices and/or output devices can be included in processing system 300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 300 are readily contemplated by one of ordinary skill in the art given the teachings of the present invention provided herein.

Figure 4:
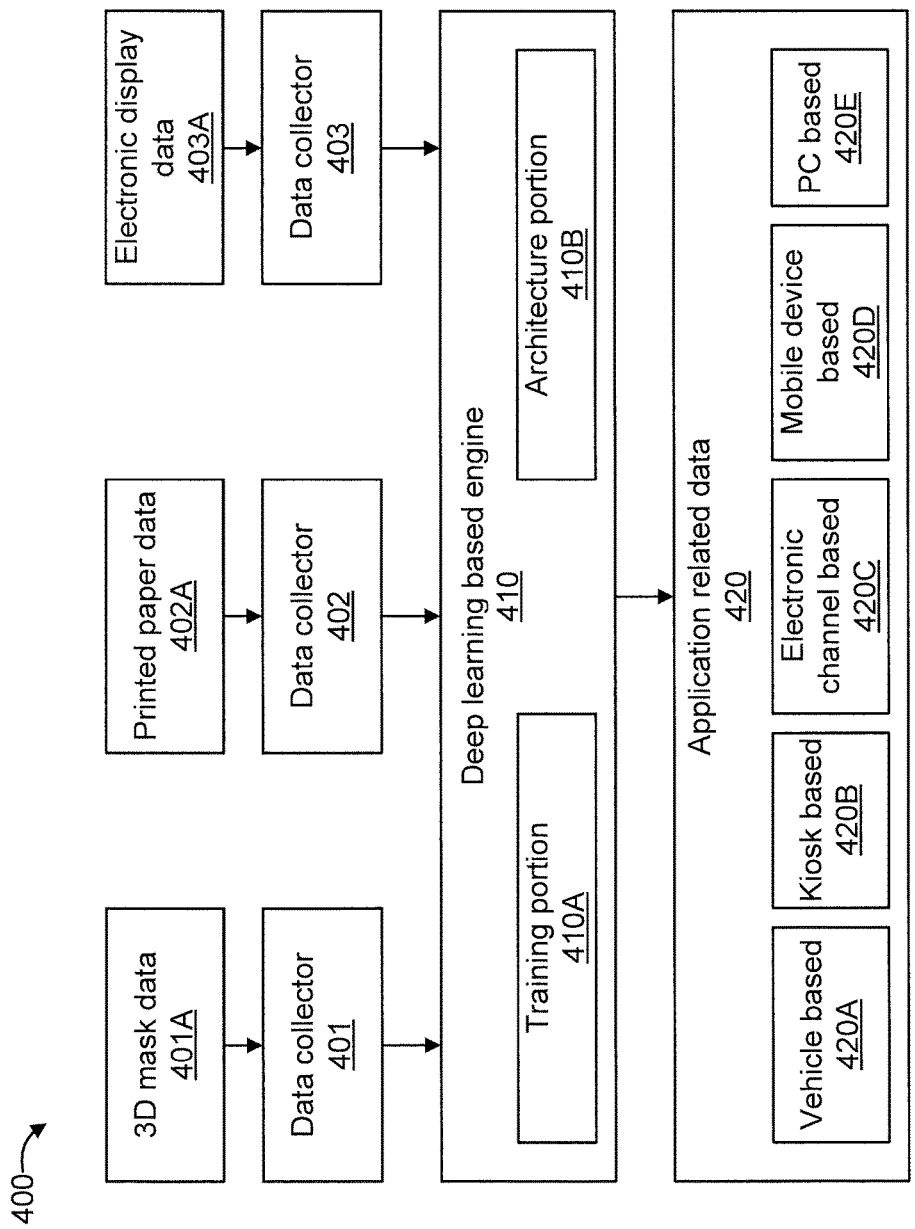
FIG. 4 shows the live image recognition system of FIG. 2, in accordance with an embodiment of the present invention.

FIG. 4 shows the live image recognition system 220 of FIG. 2, in accordance with an embodiment of the present invention.

The live image recognition system 220 includes a data collector 401, a data collector 402, a data collector 403, a deep learning engine 410, and application related data 420.

The data collector 401 is for collecting 3D mask data 401A for 3D masks that are used as potential inputs to a face recognition system.

The data collector 402 is for collecting printed paper data 402A for printed papers that are used as potential inputs to a face recognition system.

The data collector 403 is for collecting electronic display data 403A for electronic displays that are used as potential inputs to a face recognition system.

Regarding data collectors 401, 402, and 403, 3D masks, 2D printed paper, electronic devices with displays, respectively, are used as spoofing material for face recognition. In an embodiment, a large variety of data samples, which are commonly used in various applications/scenarios, is collected. In an embodiment, the collected data is preferably provided by more than one person, e.g., wearing 3D masks with different accessories (such as, for example, but not limited to, wigs, scarf, glasses, and so forth). In an embodiment, the collected data preferably includes pictures taken using different cameras like Closed Circuit Television (CCTV) cameras, web cameras, mobile device cameras, industrial grade cameras, and so forth. The 2D printed paper and electronic devices also presented in front of the cameras to collect training data. In an embodiment, the collected data involves persons with different nationalities and different postures to collect diverse training data.

The deep learning based engine 410 includes a training portion 410A and an architecture portion 410B. The deep learning based engine 410 performs deep learning for liveness detection for face recognition.

Regarding the architecture portion 410B of the deep learning based engine 410, in an embodiment, a multi-task learning objective is set up to augment liveness detection with a large-scale face recognition task. In an embodiment, features at the lower layers in the deep learning architecture are shared between these two tasks.

Further regarding the architecture portion 410B of the deep learning based engine 410, in an embodiment, data augmentations in the form of chromatic transformations and image contrast enhancements can be used, in addition to spatial transformations.

Regarding the training portion 410A of the deep learning based engine 410, in an embodiment, training is achieved by fine tuning the GoogLeNet architecture on a multitask objective that jointly optimizes liveness detection and face recognition. This allows overcoming the challenge of limited data for liveness detection by using large-scale face recognition datasets.

Further regarding the architecture portion 410B of the deep learning based engine 410, the architecture differs from a standard GoogLeNet by setting up multi-task learning on top of the original structure, which improves the generalization ability of our model.

Further regarding the training portion 410A of the deep learning based engine 410, in an embodiment, all of the layers are frozen except for the last fully connected layer. Then the two tasks of liveness detection and face recognition are combined (jointly optimized) to conduct the multi-task training. During the multi-task training, all weights of the layers are unfrozen.

Regarding the deep learning based engine 410, data preprocessing is achieved by applying face detection to the data (input images). Then, in an embodiment, the input images are normalized to 256 by 256. By further random central cropping, the final output to the network is 228 by 228. In order to increase the diversity of the training data and improve the model's ability of generalization, a data augmentation layer right after the image input. The image has a fifty percent probability to be horizontally flipped, zoomed, translated or rotated. Also, in an embodiment, an image contrast enhancement is applied by randomly adding one or more Gaussian distributed instances to the original RGB value. Additionally, in an embodiment, another image contrast enhancement is applied by adding one or more Gaussian distributed instances to the HSV domain and multiplying some coefficients to further adjust the S and V.

The application related data 420 can include data relating to vehicle based applications 420A, kiosk based applications 420B, electronic channel based applications 420C, mobile device based applications 420D, and Personal Computer (PC) based applications 420E. It is to be appreciated that the preceding applications are merely illustrative and, thus, the present invention can be applied to many other applications, as readily determined by one of ordinary skill in the art given the teachings of the present invention provided herein, while maintaining the spirit of the present invention.

Regarding vehicle based applications 420A, the liveness detection engine can be implemented on a novel platform for vehicle automatic clearance channels, which can be used for automated authentication at highways, weighing stations and border control locations.

Regarding the kiosk based applications 420B, the liveness detection engine can be implemented on a novel platform for automated authentication kiosks, which can be used for access control at airports and so forth.

Regarding the electronic channel based applications 420C, the liveness detection engine can be implemented on a novel platform for passenger automatic clearance channels, which can be used for automated entry authentication into secure areas, such as immigration at airports or at border control locations.

Regarding the mobile device applications 420D, the liveness detection engine can be implemented on mobile platforms such as cellphones and laptops, for supporting face recognition in secure access, mobile payments, banking and similar applications, and so forth.

Regarding the Personal Computer (PC) applications 420E, the liveness detection engine can be implemented on PC platforms such as desktop and laptops, for supporting face recognition in secure access, mobile payments, banking and similar applications, and so forth.

Figure 5:
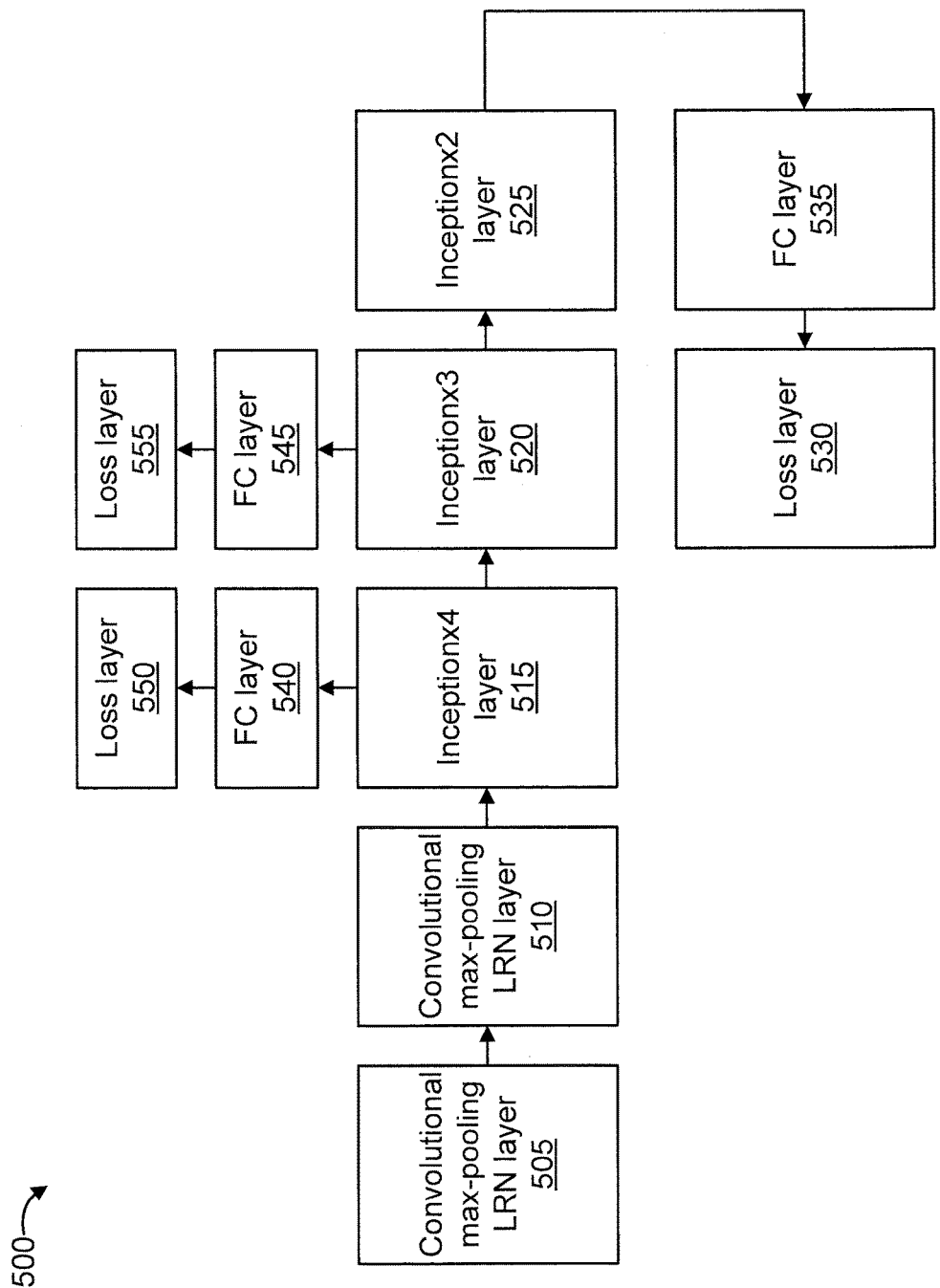
FIG. 5 shows an exemplary model architecture for the deep learning engine of FIG. 4, in accordance with an embodiment of the present invention.

FIG. 5 shows an exemplary model architecture 500 for the deep learning engine 410 of FIG. 4, in accordance with an embodiment of the present invention.

The model architecture 500 includes a convolutional max-pooling Local Response Normalization (LRN) layer 505, a convolutional max-pooling Local Response Normalization (LRN) layer 510, an inceptionx4 layer 515, an inceptionx3 layer 520, an inceptionby2 layer 525, a Fully Connected (FC) layer 530, a loss layer 535, a FC layer 540, a FC layer 545, a loss layer 550, and a loss layer 555.

The convolutional max-pooling LRN layers 505 and 510 partition an input image into a set of non-overlapping rectangles and, for each such sub-region, outputs the maximum. The intuition is that the exact location of a feature is less important than its rough location relative to other features. The convolutional max-pooling LRN layers 505 and 510 serve to progressively reduce the spatial size of the representation, to reduce the number of parameters and amount of computation in the network, and hence to also control overfitting.

The convolution layer (e.g., layer 510) takes in the original image as input and send output to the inception layers 515, 520 and 525, which further generates the output for the fully connected (FC) layer 535, 540, and 545. The output of FC layers predict the classification label and penalized by the loss layers 530, 550, and 555, which conduct back-propagation for the whole structure to update.

The high-level reasoning in the neural network is performed using the FC layers 530, 540, and 545. Neurons in a fully connected layer have full connections to all activations in the previous layer. Accordingly, their activations can be computed with a matrix multiplication followed by a bias offset.

The loss layers 535, 550, and 555 specify how training penalizes the deviation between the predicted and true labels. Various loss functions appropriate can be used, while maintaining the spirit of the present invention.

Figure 6:
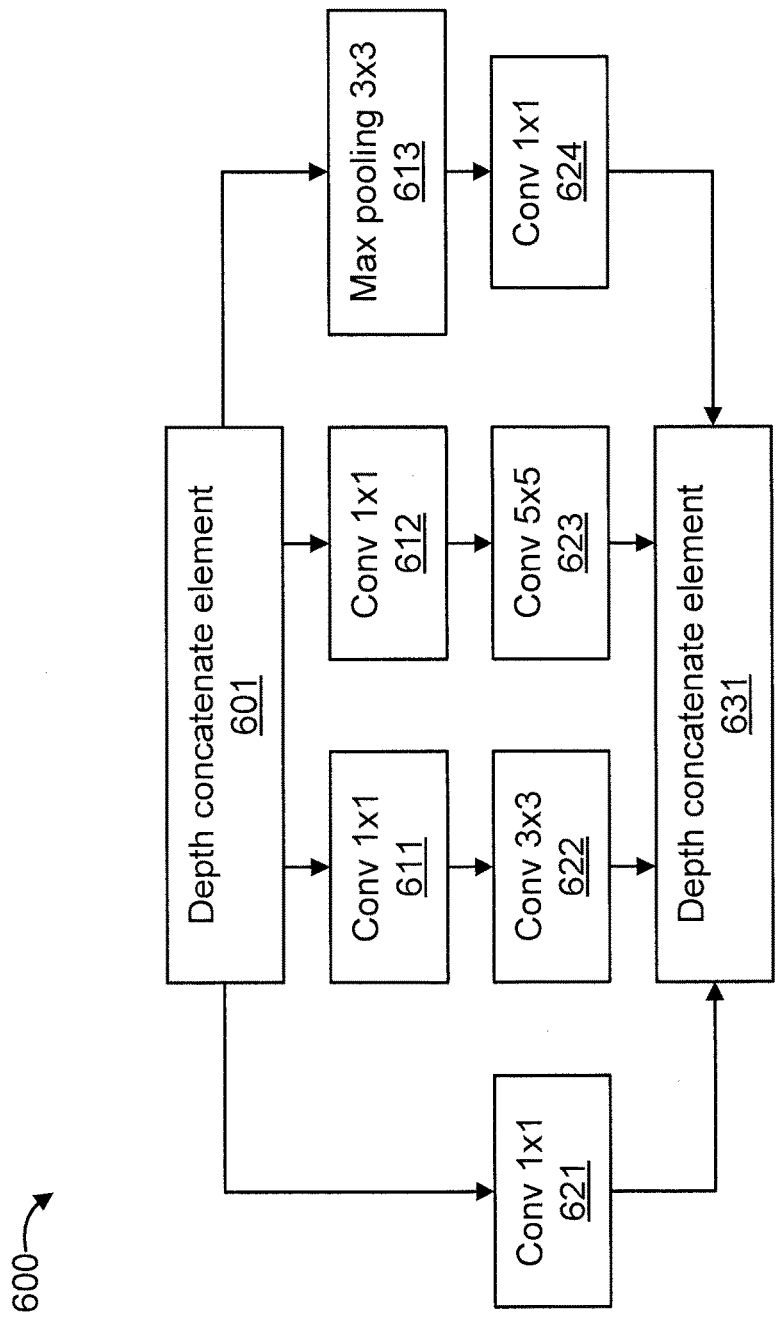
FIG. 6 shows an inception structure of the inception layers of FIG. 5, in accordance with an embodiment of the present invention.

FIG. 6 shows an inception structure 600 of the inception layers 515, 520, and 525 of FIG. 5, in accordance with an embodiment of the present invention.

The inception structure 600 includes a depth concatenate element 601, a convolutional 1×1 (Cony 1×1) element 611, a convolutional 1×1 (Cony 1×1) element 612, a Max pooling 3×3 element 613, a convolutional 1×1 (Cony 1×1) element 621, a convolutional 5×5 (Cony 5×5) element 622, a convolutional 1×1 (Cony 1×1) element 623, and a depth concatenate element 631.

Figure 7:
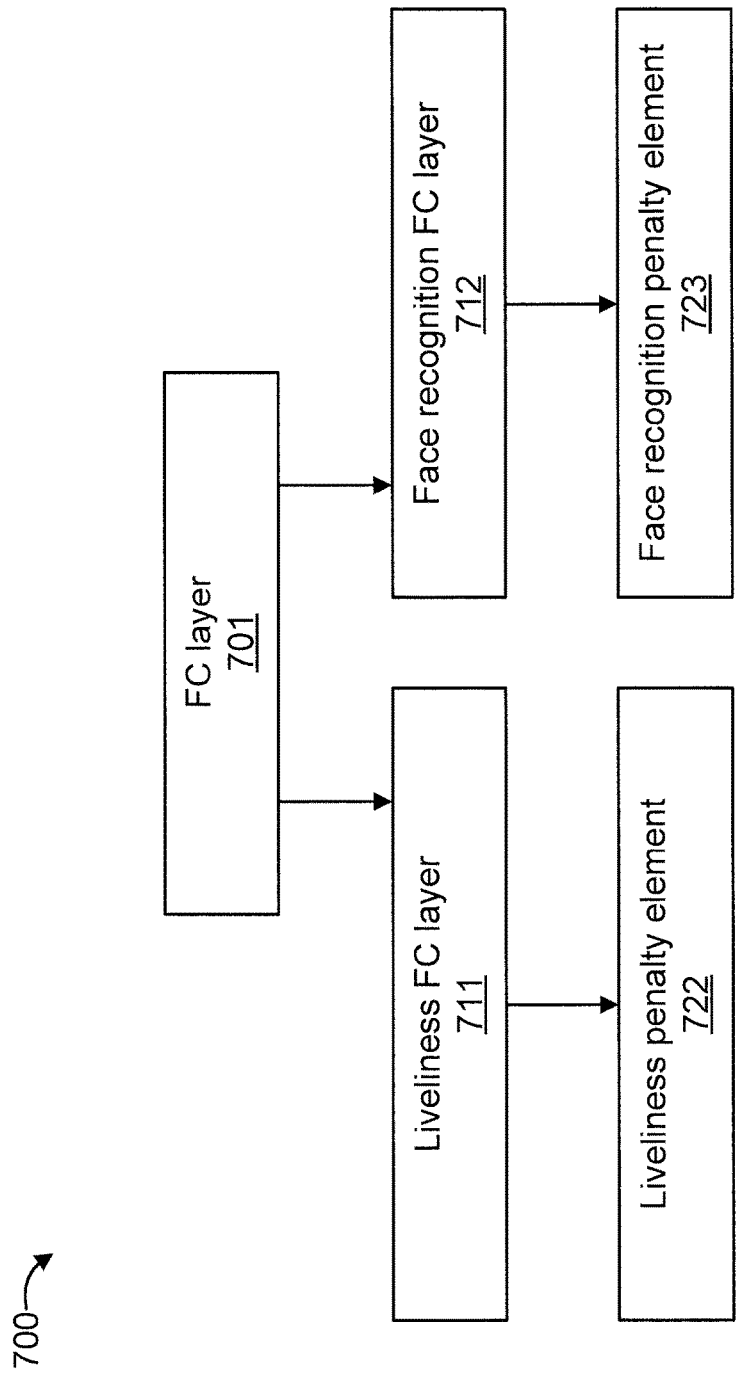
FIG. 7 shows a loss structure of the loss layers of FIG. 5, in accordance with an embodiment of the present invention.

FIG. 7 shows a loss structure 700 of the loss layers 505 and 510 of FIG. 5, in accordance with an embodiment of the present invention.

The loss structure 700 includes a Fully Connected (FC) layer 701, a liveness FC layer 711, a face recognition FC layer 712, a liveness penalty element 721, and a face recognition penalty element 722.

Figure 8:
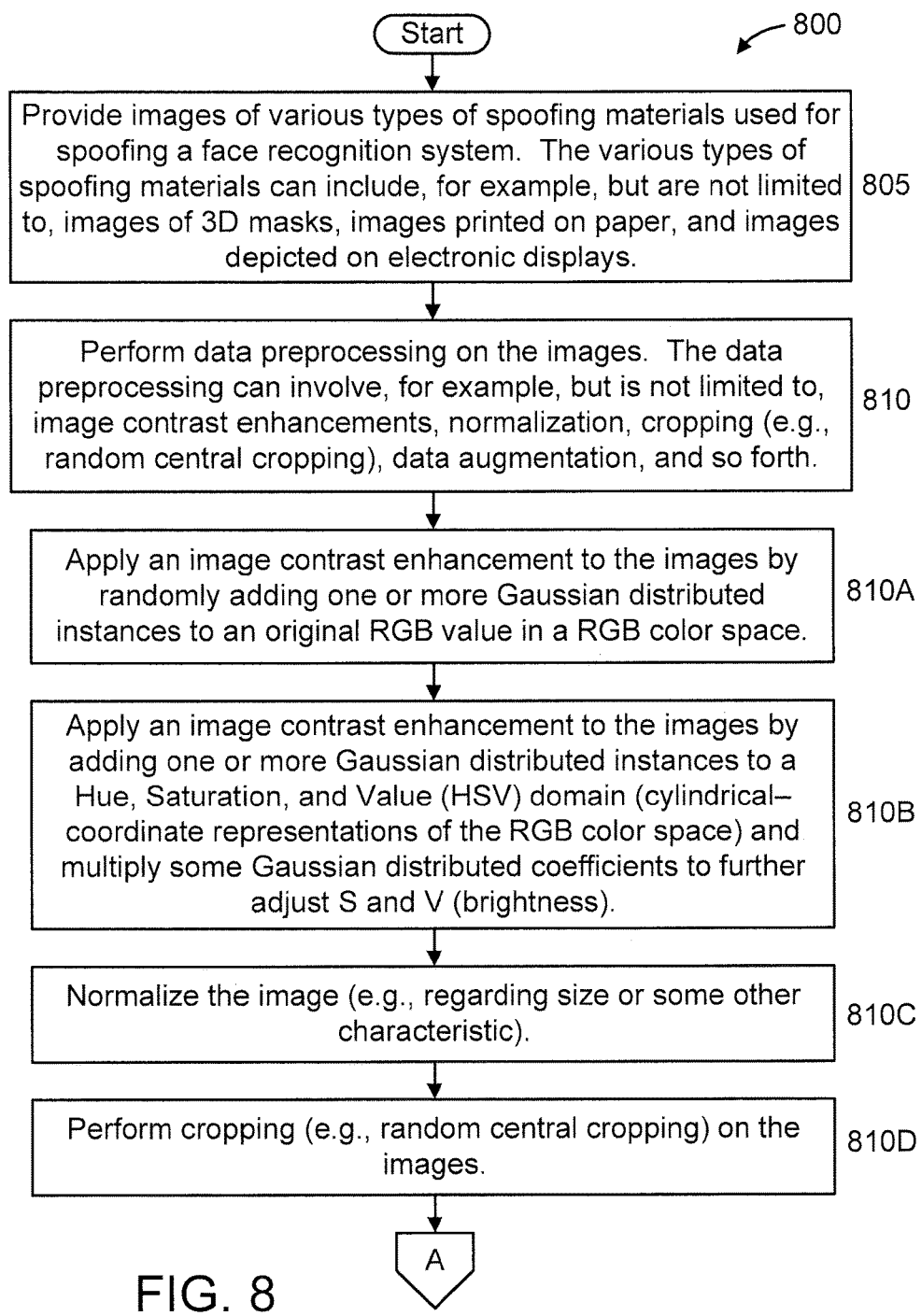
FIGS. 8-10 show an exemplary method for liveness detection for face recognition, in accordance with an embodiment of the present invention.
Figure 9:
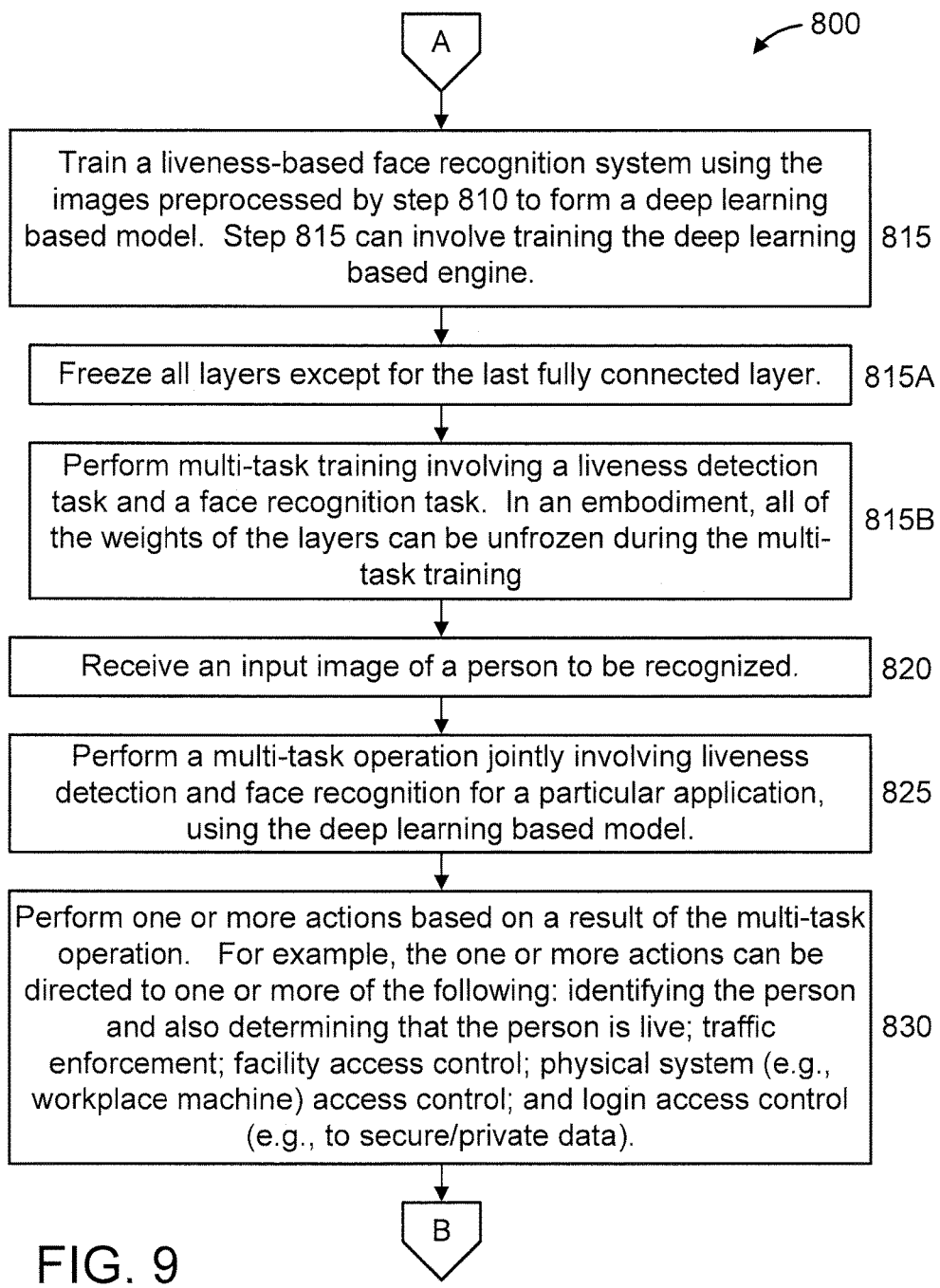
Figure 10:
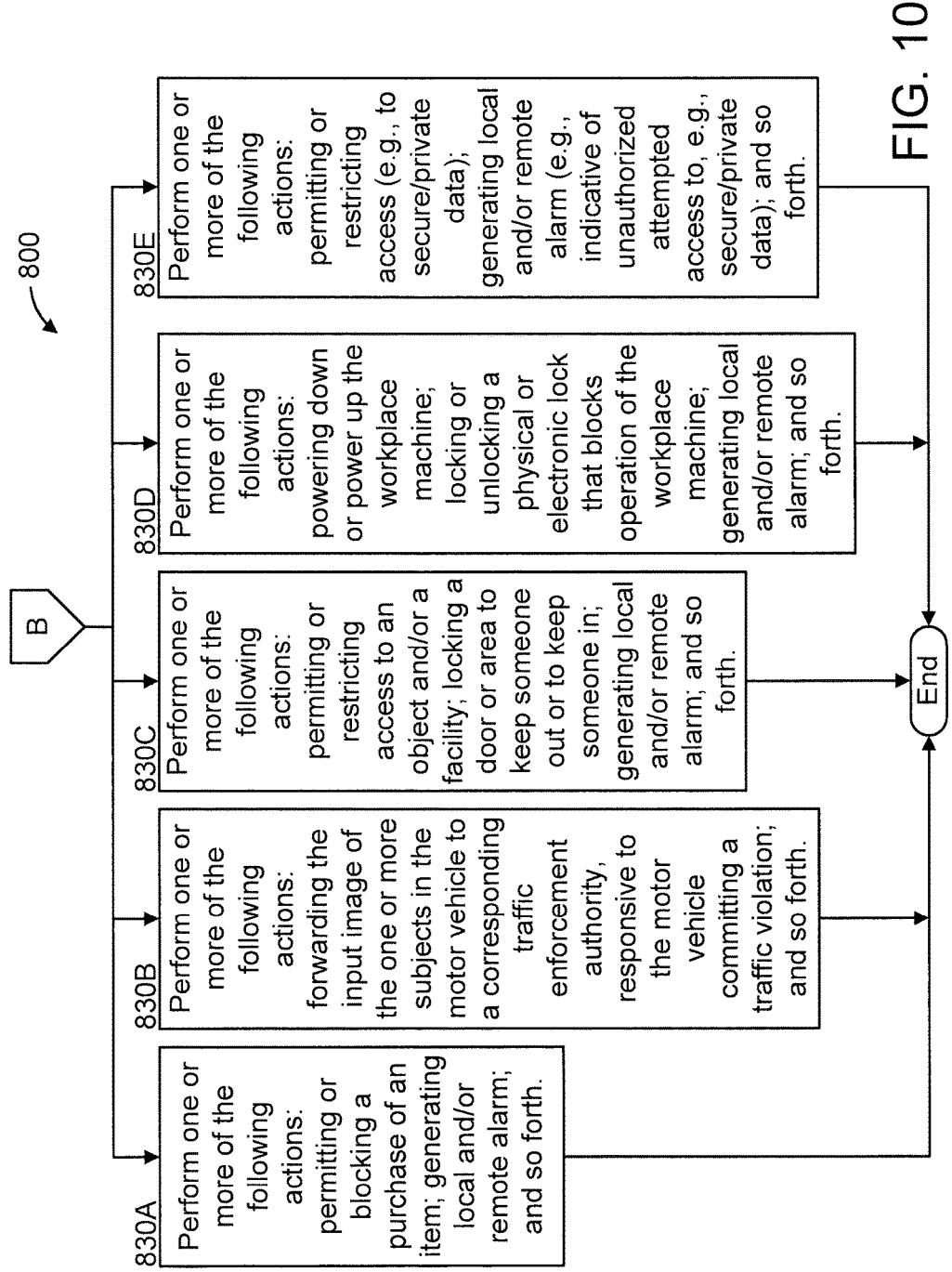

FIGS. 8-9 show an exemplary method 800 for liveness detection for face recognition, in accordance with an embodiment of the present invention. Steps 805 through 815 can be considered to correspond to a training stage 800A of method 800, while steps 820 through 825 can be considered to correspond to a recognition stage 800B of method 800, and step 830 can be considered to correspond to a post-recognition stage 800C.

At step 805, provide images of various types of spoofing materials used for spoofing a face recognition system. The various types of spoofing materials can include, for example, but are not limited to, images of 3D masks, images printed on paper, and images depicted on electronic displays.

At step 810, perform data preprocessing on the images. The data preprocessing can involve, for example, but is not limited to, image contrast enhancements, normalization, cropping (e.g., random central cropping, etc.), data augmentation, and so forth.

In an embodiment, step 810 includes one or more of steps 810A, 810B, 810C, and 810D.

At step 810A, apply an image contrast enhancement to the images by randomly adding one or more Gaussian distributed instances to an original RGB value in a RGB color space. The original image is changed to another image, which shows the variance in the RGB color space for each pixel. This changed image showing certain variance from the original input is served as the network input, which artificially increase the diversity of the input images.

At step 810B, apply an image contrast enhancement to the images by adding one or more Gaussian distributed instances to a Hue, Saturation, and Value (HSV) domain (cylindrical-coordinate representations of the RGB color space) and multiply some Gaussian distributed coefficients to further adjust S and V (brightness). By doing so, The Hue, Saturation and Value (brightness) are changed to create sufficient diversity for the input of the network.

At step 810C, normalize the image (e.g., regarding size or some other characteristic).

At step 810D, perform cropping on the images. In an embodiment, random central cropping can be performed on the images.

At step 815, train a liveness-based face recognition system using the images preprocessed by step 810 to form a deep learning based model. Step 815 can involve training the deep learning based engine.

In an embodiment, step 815 includes one or more of steps 815A and 815B.

At step 815A, freeze all layers except for the last fully connected layer.

At step 815B, perform multi-task training involving a liveness detection task and a face recognition task. In an embodiment, all of the weights of the layers can be unfrozen during the multi-task training.

At step 820, receive an input image of a person to be recognized.

At step 825, perform a multi-task operation jointly involving liveness detection and face recognition for a particular application, using the deep learning based model. The particular application can include, but is not limited to, a vehicle based application, a kiosk based application, an electronic channel based application, a mobile device application, and a personal computer application.

At step 830, perform one or more actions based on a result of the multi-task operation. For example, the one or more actions can be directed to one or more of the following: identifying the person and also determining that the person is live; traffic enforcement; facility access control; physical system (e.g., workplace machine) access control; and login access control (e.g., to secure/private data).

In an embodiment, step 830 can include one or more of steps 830A through 830E.

At step 830A, corresponding to identifying the person and also determining that the person is live, perform one or more actions that can include, but are not limited to, one or more of the following: permitting or blocking a purchase of an item; generating local and/or remote alarm; and so forth.

At step 830B, corresponding to traffic enforcement, perform one or more actions that can include, but are not limited to, one or more of the following: forwarding the input image of the one or more subjects in the motor vehicle to a corresponding traffic enforcement authority, responsive to the motor vehicle committing a traffic violation; forwarding the input image, that depicts a particular one of the one or more subjects that is located in an operating location in the motor vehicle, to a corresponding traffic enforcement authority, responsive to a liveness determination of another one of the one or more subjects in the motor vehicle being determined as not live and a location of the motor vehicle being in a High Occupancy Vehicle (HOV) lane; forwarding the input image, that depicts a particular one of the one or more subjects that is located in an operating location in the motor vehicle and another one of the one or more subjects located in a non-operating position in the motor vehicle, to a corresponding traffic enforcement authority, responsive to a liveness determination of the other one of the one or more subjects being determined as not live and a location of the motor vehicle being in a HOV lane; forwarding an image of the vehicle operator (when a liveness of a passenger "object" has been determined to be "not live"); capturing a more expansive image of the user (who should be proximate to the spoofing object) in order to capture the users' actual face (or license plate in the case of the user utilizing a fake passenger while driving in the HOV lane) and forwarding that expansive image to a corresponding traffic enforcement authority. It is to be appreciated that the initially listed action can encompass the actions that follow.

At step 830C, corresponding to facility access control, the one or more actions can include, but are not limited to, one or more of the following: permitting or restricting access to an object and/or a facility; locking a door or area to keep someone out or to keep someone in; generating local and/or remote alarm (e.g., indicative of a security breach of the facility); and so forth.

At step 830D, corresponding to physical system (e.g., workplace machine) access control, the one or more actions can include, but are not limited to, one or more of the following: powering down or powering up the workplace machine (e.g., the controlled system, machine, and/or device or a portion thereof); locking or unlocking a physical or electronic lock that blocks operation of the workplace machine (e.g., the controlled system, machine, and/or device or a portion thereof); generating local and/or remote alarm (e.g., indicative of unauthorized attempted use of the workplace machine); and so forth.

At step 830E, corresponding to login access control (e.g., to secure/private data), the one or more actions can include, but are not limited to, one or more of the following: permitting or restricting access (e.g., to secure/private data); generating local and/or remote alarm (e.g., indicative of unauthorized attempted access to, e.g., secure/private data); and so forth. Access restriction can be achieved using, for example, a switch or other physical element to prevent access to the secure data.

As is evident to one of ordinary skill in the art, the action(s) taken is(are) dependent upon the type of application to which the present invention is applied.

Figure 11:
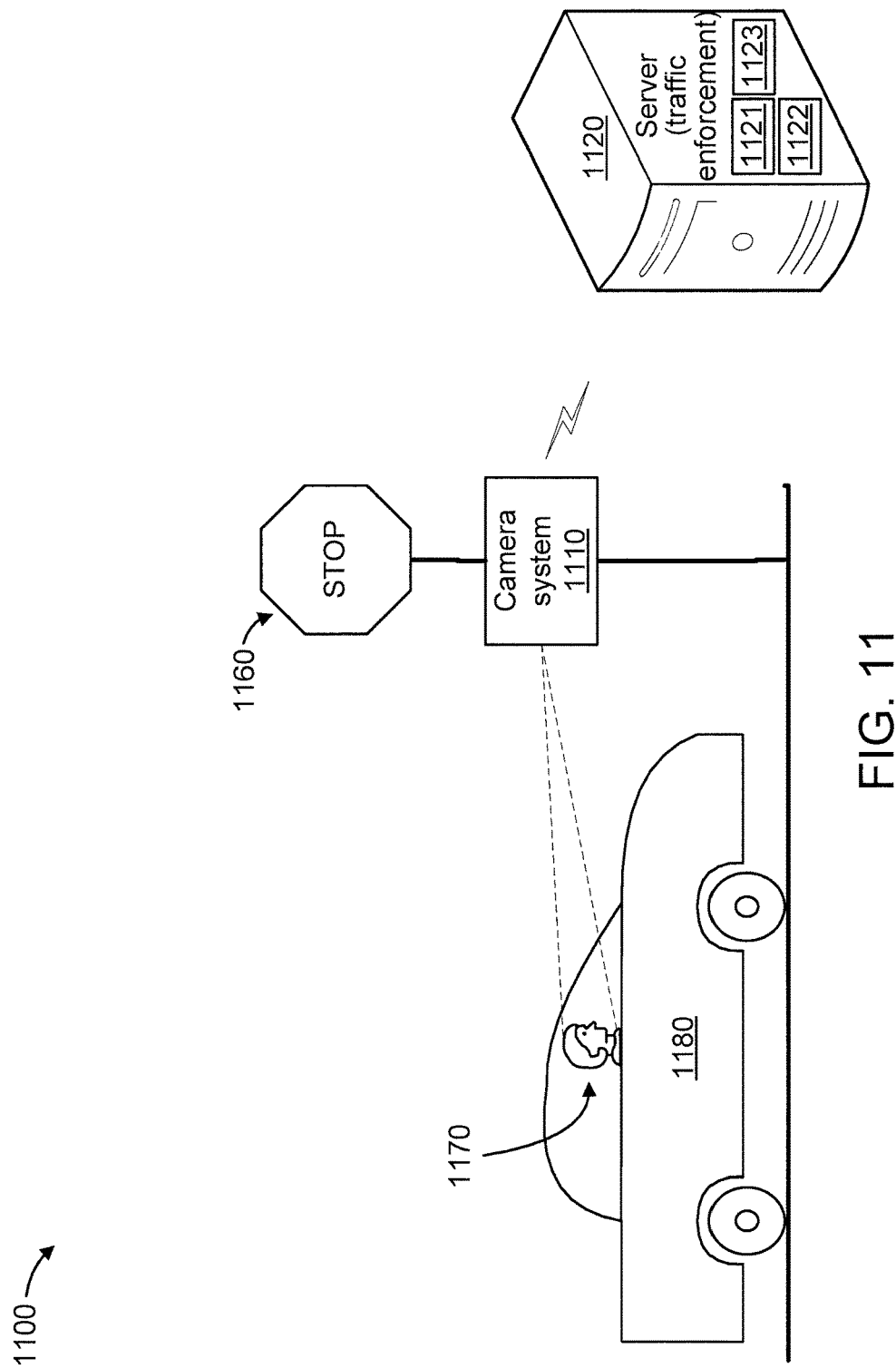
FIG. 11 shows yet another exemplary system for traffic enforcement, in accordance with an embodiment of the present invention.

FIG. 11 shows yet another exemplary system 1100 for traffic enforcement, in accordance with an embodiment of the present invention.

The system 1100 includes a camera system 1110. While a single camera system 1110 is shown in FIG. 11 for the sakes of illustration and brevity, it is to be appreciated that multiple camera systems can be also used, while maintaining the spirit of the present invention.

In the embodiment of FIG. 11, the camera system 1110 is mounted on a mounting entity 1160. For the sake of illustration, the mounting entity 1160 is a pole 1160. The pole 1160 is also used to support a stop sign. Of course, a dedicated pole or other mounting entity could also be used. Thus, while a pole 1160 is shown for the sake of illustration, any other mounting entity can be used, as readily appreciated by one of ordinary skill in the art given the teachings of the present invention provided herein, while maintaining the spirit of the present invention. For example, the camera system 1110 can be mounted on a building, a drone, and so forth. The preceding examples are merely illustrative. It is to be appreciated that multiple mounting entities can be located at control hubs and sent to a particular location as needed.

The camera system 1110 can be a wireless camera system or can use one or more antennas included on the pole 1160 (or other mounting entity (e.g., building, drone, etc.) to which the camera system 1110 is mounted or proximate).

The system 1100 further includes a server 1120 for traffic enforcement. The server 1120 can be configured to perform traffic enforcement based on liveness detection for antispoof face recognition. The server 1120 can located remote from, or proximate to, the camera system 1110. The server 1120 includes a processor 1121, a memory 1122, and a wireless transceiver 1123. The processor 1121 and the memory 1122 of the remove server 1120 are configured to perform liveness detection for antispoof face recognition based on images received from the camera system 1110 by the (the wireless transceiver 1123 of) the remote server 1120. To that end, the processor 1121 and memory 1122 can be configured to include components of a face recognition system and a live image recognition system. In this way, the face of a person 1170 in a vehicle 1180 can be recognized and a liveness of the person 1170 can also be determined. Accordingly, a vehicle driver can be positively identified and associated with a traffic offense, while the state of liveness of a "passenger object" (false person such as, for example, a mannequin), if present, can also be identified and associated with a traffic offense (violation of the number of persons allowed in a High Occupancy Vehicle (HOV) lane) for the vehicle driver.

Accordingly, some exemplary suitable environments to which the present invention can be applied can include any environments a face recognition result can be associated with traffic enforcement. Moreover, further exemplary suitable environments can include any environments where liveness detection can be used to augment a face recognition result for traffic enforcement.

Figure 12:
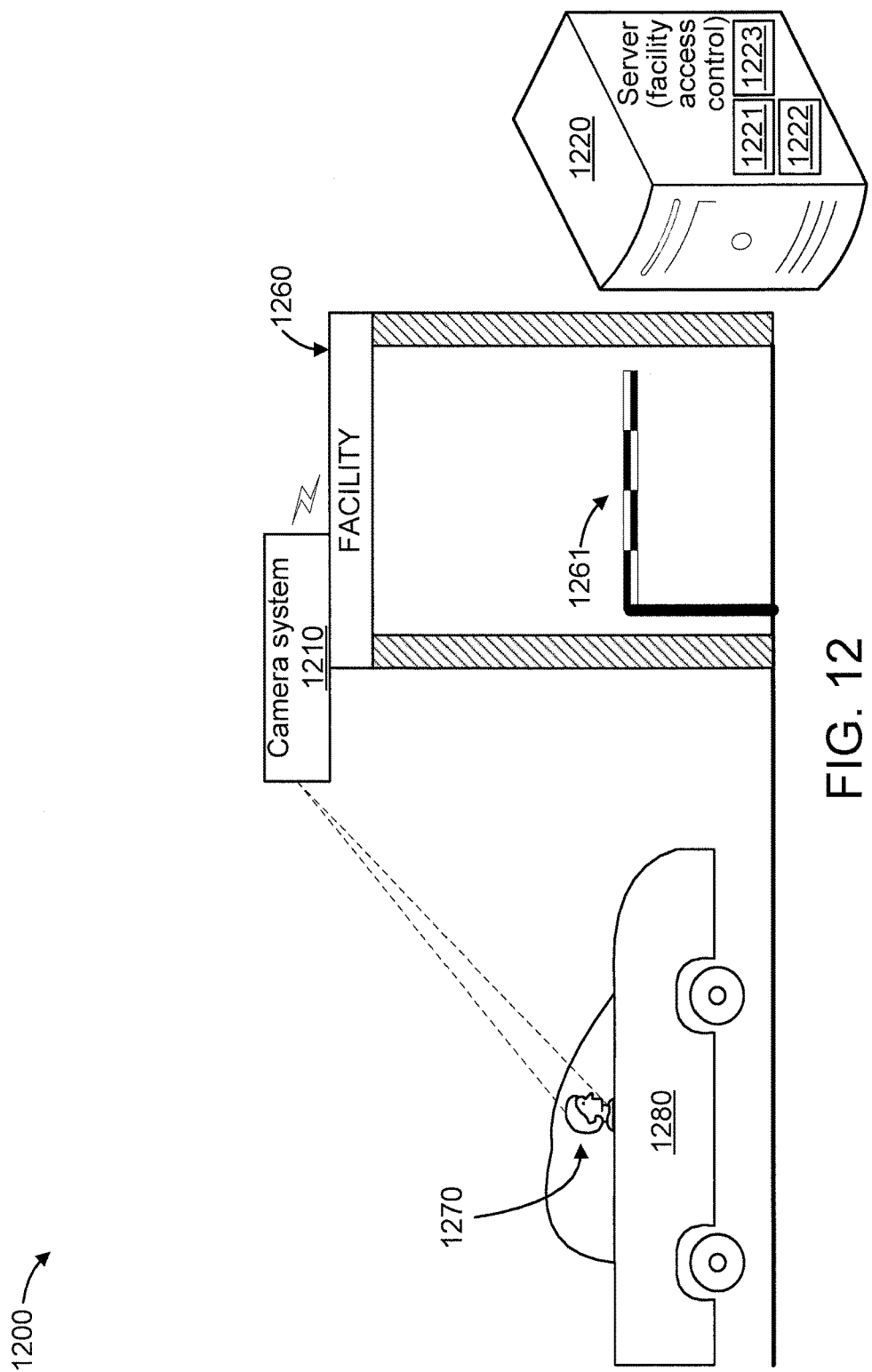
FIG. 12 shows yet another exemplary system for facility access control, in accordance with an embodiment of the present invention.

FIG. 12 shows yet another exemplary system 1200 for facility access control, in accordance with an embodiment of the present invention.

The system 1200 includes a camera system 1210. While a single camera system 1210 is shown in FIG. 12 for the sakes of illustration and brevity, it is to be appreciated that multiple camera systems can be also used, while maintaining the spirit of the present invention.

In the embodiment of FIG. 12, the camera system 1210 is mounted on a mounting entity 1260. For the sake of illustration, the mounting entity 1260 is an arch structure 1260 having a controlled gate 1261. The gate 1261 can be normally closed and then opened based on a recognition result regarding the person 1270 attempting to gain access to the facility. While an arch structure 1260 with a gate 1261 is shown for the sake of illustration, any other mounting entity can be used, as readily appreciated by one of ordinary skill in the art given the teachings of the present invention provided herein, while maintaining the spirit of the present invention. For example, the camera system 1210 can be mounted on a building, a pole, and so forth. The preceding examples are merely illustrative. It is to be appreciated that multiple mounting entities can be located at control hubs and sent to a particular location as needed.

The camera system 1210 can be a wireless camera system or can use one or more antennas included on the arch structure 1260 (or other mounting entity (e.g., building, drone, etc.) to which the camera system 1210 is mounted or proximate).

The system 1200 further includes a server 1220 for liveness detection for antispoof face recognition. The server 1220 can located remote from, or proximate to, the camera system 1210. The server 1220 includes a processor 1221, a memory 1222, and a wireless transceiver 1223. The processor 1221 and the memory 1222 of the remove server 1220 are configured to perform liveness detection for antispoof face recognition based on images received from the camera system 1210 by the (the wireless transceiver 1223 of) the remote server 1220. To that end, the processor 1221 and memory 1222 can be configured to include components of a face recognition system and a live image recognition system. In this way, the face of a person 1270 in a vehicle 1280 can be recognized and a liveness of the person 1270 can also be determined for the purpose of facility access control. The face recognition and liveness detection can be performed on multiple vehicle occupants including the driver. Moreover, persons walking up to the arch structure 1260 (i.e., without being in a vehicle) can also be recognized and so forth in accordance with the present invention.

Accordingly, some exemplary suitable environments to which the present invention can be applied can include any environments a person must be recognized in order to gain access to a facility. Moreover, further exemplary suitable environments can include any environments where liveness detection can be used to augment a face recognition result for facility access control.

Figure 13:
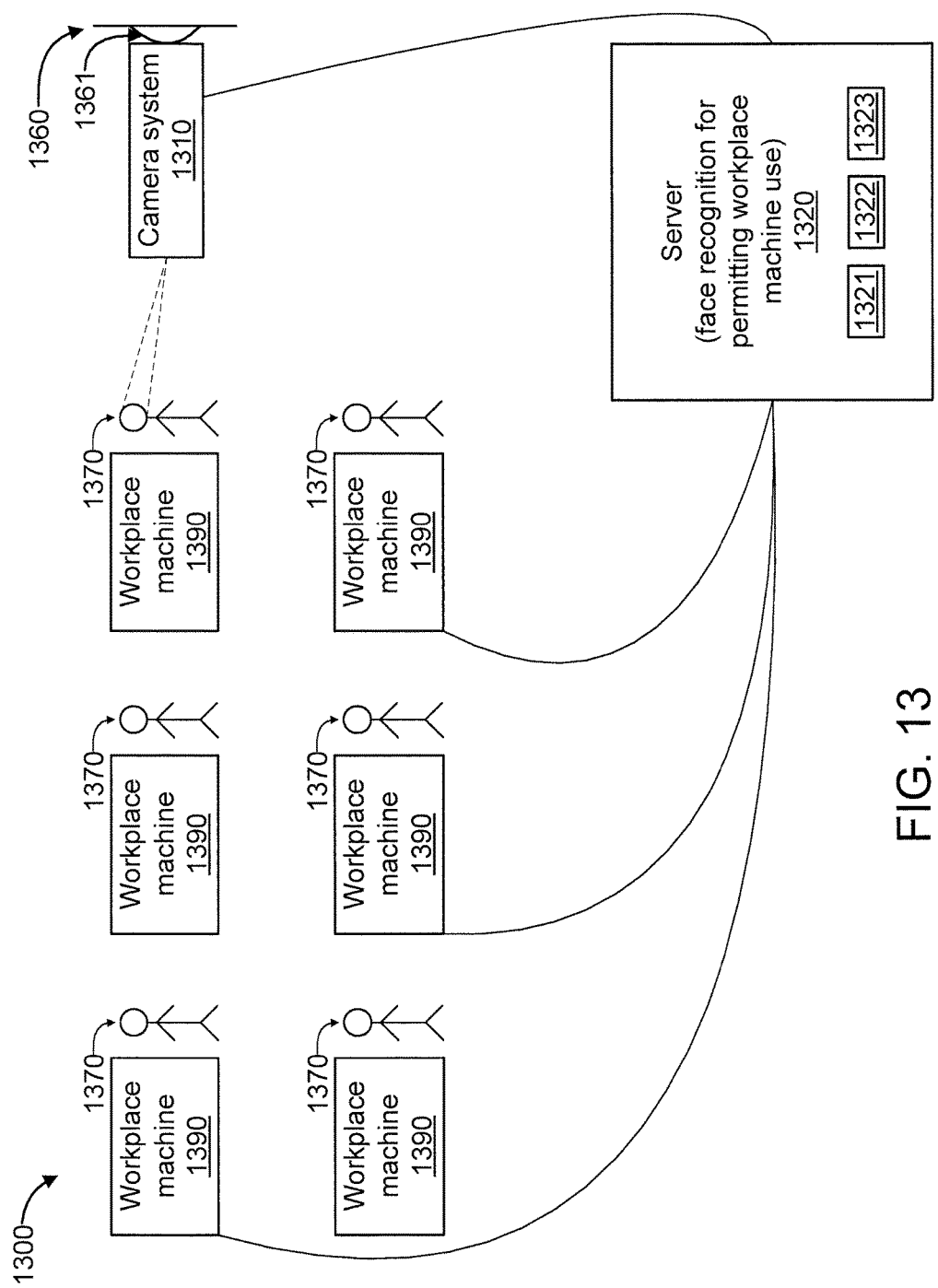
FIG. 13 shows yet another exemplary system for physical system access control, in accordance with an embodiment of the present invention.

FIG. 13 shows yet another exemplary system 1300 for physical system access control, in accordance with an embodiment of the present invention. The system 1300 can be used to control access to a workplace machine.

The system 1300 includes a camera system 1310. While a single camera system 1310 is shown in FIG. 13 for the sakes of illustration and brevity, it is to be appreciated that multiple camera systems can be also used, while maintaining the spirit of the present invention.

In the embodiment of FIG. 13, the camera system 1310 is mounted on a mounting entity 1360. For the sake of illustration, the mounting entity 1360 involves a section of a wall (hereinafter "wall section") 1360 and a mounting bracket 1361. While a wall section 1360 and a mounting bracket 1361 are shown for the sake of illustration, any other mounting entity(ies) can be used, as readily appreciated by one of ordinary skill in the art given the teachings of the present invention provided herein, while maintaining the spirit of the present invention. For example, the camera system 1310 can be mounted on a pole, and so forth. The preceding examples are merely illustrative. It is to be appreciated that multiple mounting entities can be located at control hubs and sent to a particular location as needed.

The camera system 1310 can be a wireless camera system or can use one or more antennas included on the wall section 1360 and/or the mounting bracket 1361 (or other mounting entity (e.g., building, pole, drone, etc.) to which the camera system 1310 is mounted or proximate).

The system 1300 further includes a server 1320 for liveness detection for antispoof face recognition for permitting workplace machine use. The server 1320 can located remote from, or proximate to, the camera system 1310. The server 1320 includes a processor 1321, a memory 1322, and a wireless transceiver 1323. The processor 1321 and the memory 1322 of the remove server 1320 are configured to perform liveness detection for antispoof face recognition based on images received from the camera system 1310 by the (the wireless transceiver 1323 of) the remote server 1320. To that end, the processor 1321 and memory 1322 can be configured to include components of a face recognition system and a live image recognition system. In this way, the face of a person 1370 that is to operate a workplace machine 1390 can be recognized and a liveness of the person 1370 can also be determined. Here, liveness can be correlated to attentiveness, in that a sleeping person can be considered to lack liveness, therefore resulting in an alarm or other action being performed in order to prevent the inattentive employee from operating a workplace machine 1390. The face recognition and liveness detection can be performed on multiple operators of multiple workplace machines 1390.

Accordingly, some exemplary suitable environments to which the present invention can be applied can include any environments a person must be recognized in order to gain access to a workplace machine. Moreover, further exemplary suitable environments can include any environments where liveness detection can be used to augment a face recognition result for workplace machine use control.

Figure 14:
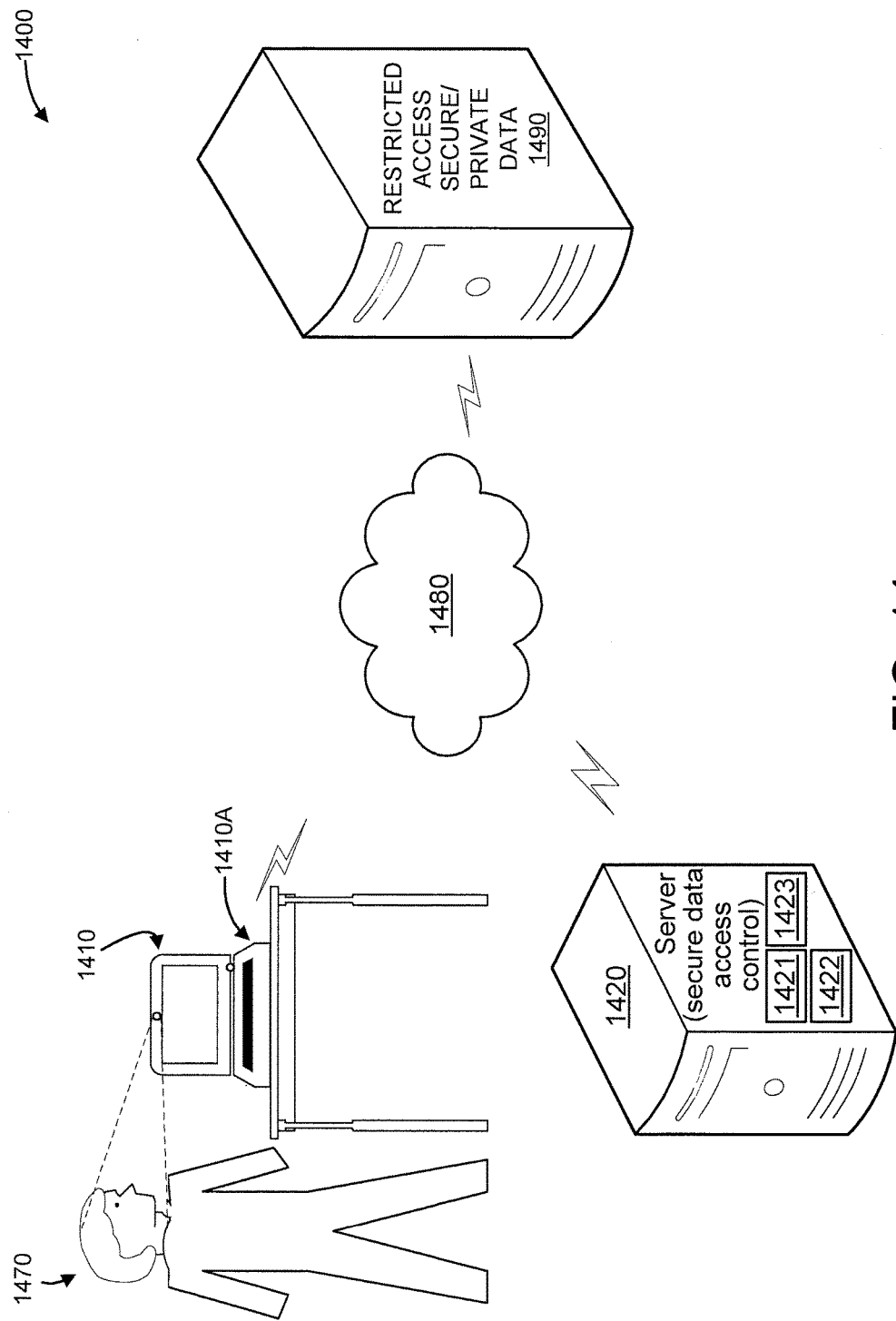
FIG. 14 shows yet another exemplary system for login access control for secure/private data, in accordance with an embodiment of the present invention.

FIG. 14 shows yet another exemplary system 1400 for login access control for secure/private data, in accordance with an embodiment of the present invention.

The system 1400 includes a camera system 1410. While a single camera system 1410 is shown in FIG. 14 for the sakes of illustration and brevity, it is to be appreciated that multiple camera systems can be also used, while maintaining the spirit of the present invention.

In the embodiment of FIG. 14, the camera system 1410 is embodied in a laptop 1460. Hence, the laptop can be considered a mounting entity for the camera system 1410. While a laptop 1460 is shown for the sake of illustration, any other mounting entity(ies) can be used, as readily appreciated by one of ordinary skill in the art given the teachings of the present invention provided herein, while maintaining the spirit of the present invention. For example, the camera system 1410 can be mounted on a pole, and so forth. The preceding examples are merely illustrative. It is to be appreciated that multiple mounting entities can be located at control hubs and sent to a particular location as needed.

The camera system 1410 can communicate with the server 1420 using a wireless transceiver 1410A of the laptop 1410.

The system 1400 further includes a server 1420 for liveness detection for antispoof face recognition for controlled access to secure/private data on a server 1490. The server 1420 can located remote from, or proximate to, the camera system 1410. The server 1420 includes a processor 1421, a memory 1422, and a wireless transceiver 1423. The processor 1421 and the memory 1422 of the remove server 1520 are configured to perform liveness detection for antispoof face recognition based on images received from the camera system 1410 by the (the wireless transceiver 1423 of) the remote server 1420. To that end, the processor 1421 and memory 1422 can be configured to include components of a face recognition system and a live image recognition system. In this way, the face of a person 1470 that is to login to a network (e.g., network 1480) or device (e.g., server 1490) can be recognized and a liveness of the person 1470 can also be determined in order to control access to the secure/private data.

The system 1400 can be used to control access to the server 1490 through computer network 1480. Access control is performed by the server 1420. The elements shown relative to FIG. 14 are set forth for the sake of illustration. However, it is to be appreciated that the present invention can be applied to other network configurations and other operational environments as readily contemplated by one of ordinary skill in the art given the teachings of the present invention provided herein, while maintaining the spirit of the present invention.

A description will now be given of some of the many attendant advantages of the present invention, in accordance with one or more embodiments of the present invention.

In an embodiment, the present invention uses a single image, thus reducing complexity of the acquisition system compared to the prior art.

In an embodiment, the present invention achieves very high accuracy and negligible false alarms, thus providing a higher quality of the result than previous methods.

In an embodiment, a purely image-based system is used, thus reducing the cost of the system compared to using active sensors.

In an embodiment, the robustness of the present invention is higher than prior art solutions, since passive imaging is not sensitive to deployment configurations.

In an embodiment, the present invention can achieve very high generality, thus being capable of being used to support any application where face recognition is deployed. In an embodiment, no additional hardware is required, as the present invention can be incorporated into an existing face recognition system.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A face recognition system, comprising:
  a camera configured to capture an input image of a subject purported to be a person;
  a memory storing a deep learning model configured to perform multi-task learning for a pair of tasks including a liveness detection task and a face recognition task; and
  a processor configured to apply the deep learning model to the input image to recognize an identity of the subject in the input image and a liveness of the subject, and wherein the liveness detection task is configured to evaluate a plurality of different distractor modalities corresponding to different physical spoofing materials to prevent face spoofing for the face recognition task.

2. The face recognition system of claim 1, wherein the different physical spoofing materials comprise spoofing materials selected from the group consisting of a 3D mask, a printed image, and an electronic display.

3. The face recognition system of claim 1, wherein the processor is further configured to perform data preprocessing on the input images selected from the group consisting of image contrast enhancements, data augmentation, and cropping.

4. The face recognition system of claim 1, wherein the processor is further configured to apply an image contrast enhancement to the input images by randomly adding one or more Gaussian distributed instances to an original RGB value of the input images.

5. The face recognition system of claim 1, wherein the processor is further configured to apply an image contrast enhancement to the input images by adding one or more Gaussian distributed instances to a Hue, Saturation, and Value (HSV) domain and multiplying two or more coefficients in the HSV domain to further adjust the Saturation and the Value of the input images.

6. The face recognition system of claim 1, wherein the processor is further configured to perform random central cropping on the input images.

7. The face recognition system of claim 1, wherein the processor is further configured to perform a data augmentation process on the input images to augment data in the images and increase a generality of the deep learning model to the different distractor modalities.

8. The face recognition system of claim 1, wherein the deep learning model is forming to include a plurality of layers, and the processor is further configured to train the deep learning model by freezing each of the plurality of layers except a last fully connected layer therein, and performing multi-task training by combining the liveness detection task and the face recognition task, wherein during the multi-task training, all weights of the plurality of layers are unfrozen.

9. The face recognition system of claim 1, wherein the deep learning model is formed using an inception structure configured to multiply an output of a convolution layer of the deep learning model with the input images to produce a new image having amplified extracted features relative to the at least one of the input images.

10. The face recognition system of claim 1, wherein the deep learning model is formed using a loss structure that includes a face liveness penalty and a face recognition penalty.

11. A computer-implemented method for liveness detection and face recognition, the method comprising:
  capturing, by a camera, an input image of a subject purported to be a person;
  storing, in a memory, a deep learning model configured to perform multi-task learning for a pair of tasks including a liveness detection task and a face recognition task; and
  applying, by a processor, the deep learning model to the input image to recognize an identity of the subject in the input image and a liveness of the subject, and wherein the liveness detection task is configured to evaluate a plurality of different distractor modalities corresponding to different physical spoofing materials to prevent face spoofing for the face recognition task.

12. The computer-implemented method of claim 11, wherein the different physical spoofing materials comprise spoofing materials selected from the group consisting of a 3D mask, a printed image, and an electronic display.

13. The computer-implemented method of claim 11, further comprising performing data preprocessing on the input images selected from the group consisting of image contrast enhancements, data augmentation, and cropping.

14. The computer-implemented method of claim 11, further comprising applying an image contrast enhancement to the input images by randomly adding one or more Gaussian distributed instances to an original RGB value of the input images.

15. The computer-implemented method of claim 11, further comprising applying an image contrast enhancement to the input images by adding one or more Gaussian distributed instances to a Hue, Saturation, and Value (HSV) domain and multiplying two or more coefficients in the HSV domain to further adjust the Saturation and the Value of the input images.

16. The computer-implemented method of claim 11, further comprising performing a data augmentation process on the input images to augment data in the images and increase a generality of the deep learning model to the different distractor modalities.

17. The computer-implemented method of claim 11, wherein the deep learning model is formed to include a plurality of layers, and the method further comprises training the deep learning model by:
    freezing each of the plurality of layers except a last fully connected layer therein; and
    performing multi-task training by combining the liveness detection task and the face recognition task, wherein during the multi-task training, all weights of the plurality of layers are unfrozen.

18. The computer-implemented method of claim 11, wherein the deep learning model is formed using an inception structure configured to multiply an output of a convolution layer of the deep learning model with at least one of the input images to produce a new image having amplified extracted features relative to the input images.

19. The computer-implemented method of claim 11, wherein the pair of tasks are performed for an electronic-payment process.

20. A computer program product for liveness detection and face recognition, the computer program product comprising a non-transitory computer readable storage medium having program instructions embodied therewith, the program instructions executable by a computer to cause the computer to perform a method comprising:
    capturing, by a camera, an input image of a subject purported to be a person;
    storing, in a memory, a deep learning model configured to perform multi-task learning for a pair of tasks including a liveness detection task and a face recognition task; and
    applying, by a processor, the deep learning model to the input image to recognize an identity of the subject in the input image and a liveness of the subject, and wherein the liveness detection task is configured to evaluate a plurality of different distractor modalities corresponding to different physical spoofing materials to prevent face spoofing for the face recognition task.

* * * * *